Aug. 22, 1950     E. A. HENGST     2,519,468
PORTABLE DRILLING JIG
Filed Nov. 7, 1949     2 Sheets-Sheet 1
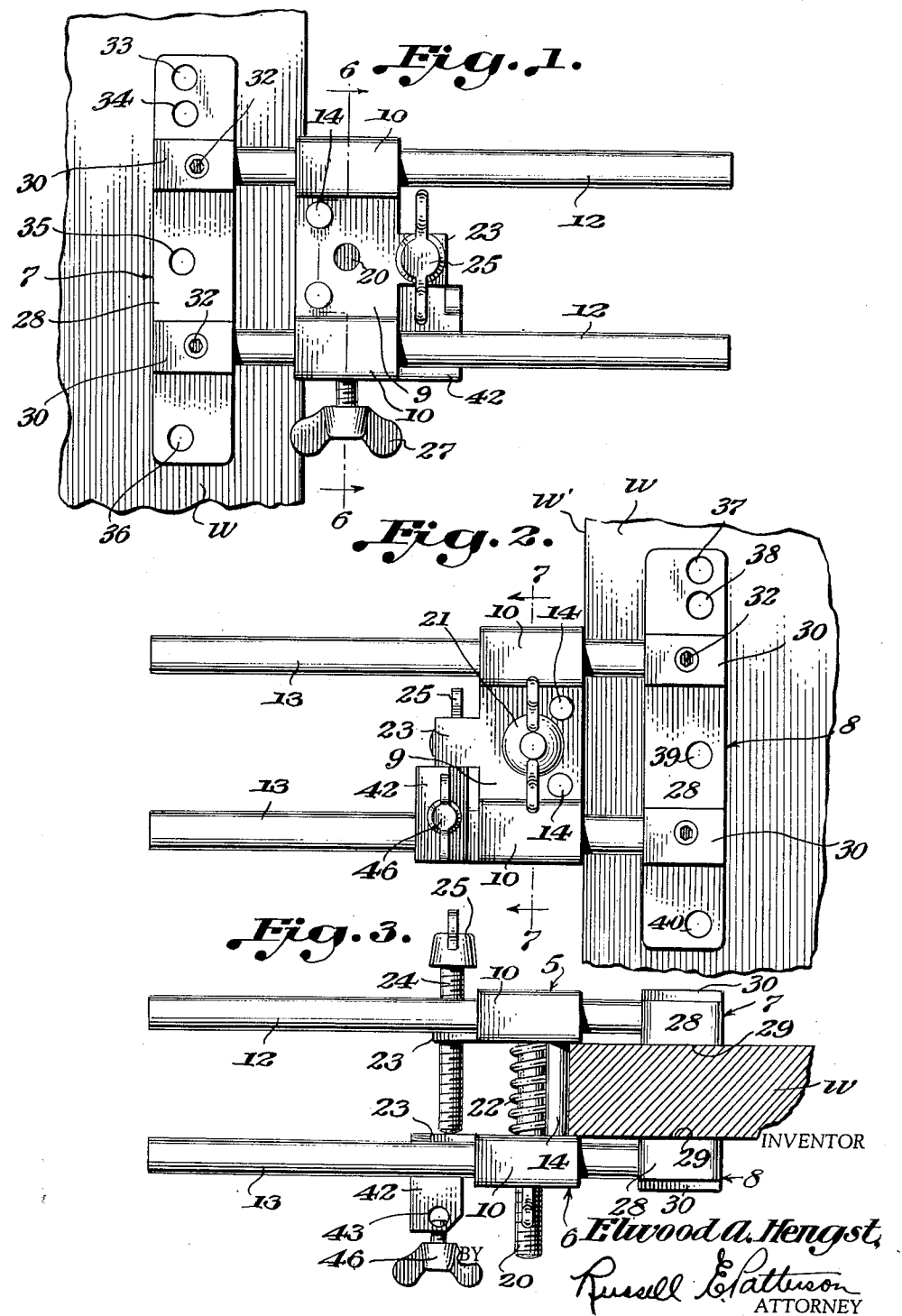
INVENTOR
Elwood A. Hengst,
Russell E. Patterson
ATTORNEY

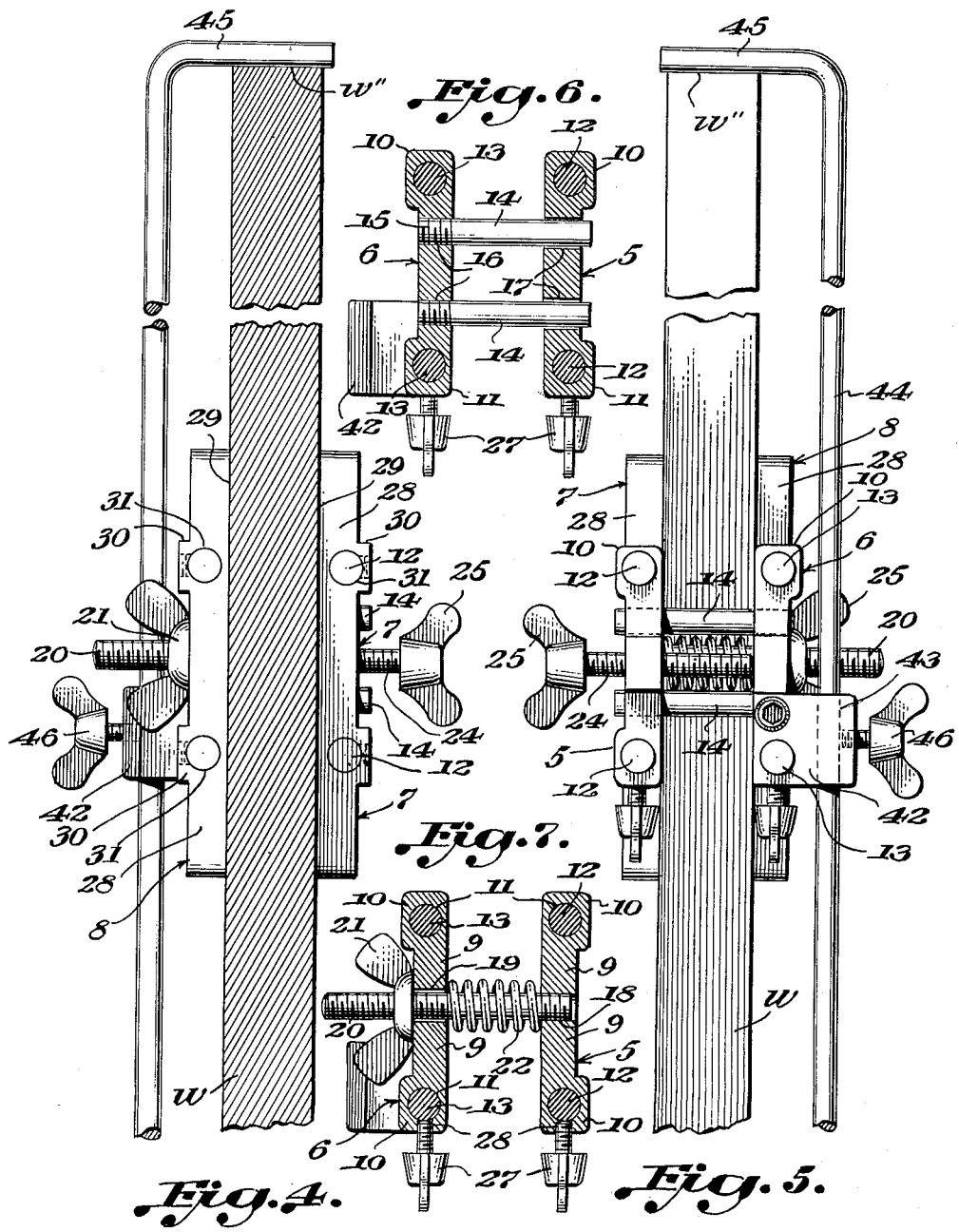

Patented Aug. 22, 1950

2,519,468

UNITED STATES PATENT OFFICE 2,519,468

PORTABLE DRILLING JIG

Elwood A. Hengst, Los Angeles, Calif.

Application November 7, 1949, Serial No. 125,999

12 Claims. (Cl. 77—62)

1

The present invention relates to jigs and fixtures, and more particularly to a portable drilling jig for drilling holes in closure panels to facilitate the application of hardware such as hinges, handles and locks.

One object of the invention is to provide a portable drilling jig which can be conveniently and quickly applied to a closure panel such as a door or the like to accurately position the jig plates and enable openings to be drilled in the panel in a quick and easy manner.

Another object is to provide a drilling jig which can be quickly positioned and tightened in place to enable openings and holes to be drilled in door panels and the like in exactly the same location for each work piece.

Another object is to provide a portable drilling jig which can be quickly released to permit the removal of the drilling jig after use.

Another object is to provide a portable drilling jig and fixture which is comparatively sturdy and possesses great strength to positively hold the work and enable the portable jig fixture to be securely positioned on a door panel or the like with no chance of movement after it has been tightened in place.

Another object of the invention is to provide a portable drilling jig and fixture having a pair of parallel jig plates with a series of correspondingly positioned openings to permit the drill to have a running fit therewith and prevent the drill from splitting the wood on the opposite side as it emerges from the rear of the work.

Another object of the invention is to provide a portable drilling fixture and jig including a pair of jig plates arranged in parallel relation and adapted to be positioned relative to the work by stop means engageable with at least two edge surfaces of the work piece such as adjacent angular edge portions of a door, panel or other work piece.

Another object of the invention is to provide a drilling fixture and positioner which can be quickly and easily adjusted to position the jig plates at any desired location with respect to the angular edge surfaces of a piece of work.

Another object is to provide a portable drilling jig and fixture which can be conveniently positioned with respect to workpieces such as the edge of a door, drawer, shelf or other work edge of the work piece with the edges of the work piece forming reference points for locating the fixture.

Other objects and advantages of the invention will become apparent during the course of the

2 following description of the accompanying drawings wherein:

Figure 1 is a front elevational view of the drilling fixture showing the same applied to the edge of a panel work piece and correctly positioned relative thereto for drilling holes at desired locations.

Figure 2 is a rear elevational view similar to Figure 1, but showing the fixture reversed as well as the work piece.

Figure 3 is a side elevational view of the portable drilling jig and fixture showing the manner in which the drilling jig plates are arranged on opposite sides of the work piece and clampingly held in position thereon.

Figure 4 is a front edge elevational view of the portable drilling jig showing the work piece in section and further illustrating the manner in which the jig plates are tightly clamped in position on opposite sides of the work piece.

Figure 5 is a rear edge elevational view of the drilling jig and fixture showing the manner in which the clamping blocks are slidably connected to move in parallelism and illustrating the clamping screws for forcing the jig plates into tight clamping engagement with the work piece.

Figure 6 is a vertical cross sectional view taken on the irregular line 6—6 of Figure 1, and illustrating the manner in which the clamping plates are guided to move to and fro relative one to the other in parallel relation, and Figure 7 is a vertical cross sectional view taken on line 7—7 of Figure 2 looking in the direction of the arrows and illustrating one of the clamping screws to facilitate the quick positioning and removal of the drilling jig and fixture with respect to the work panel or piece.

In the drawings, and more in detail there is shown for the purpose of convenience of illustration a pair of clamping blocks generally designated 5 and 6 and a pair of jig plates likewise generally designated 7 and 8. The jig plates are adjustably connected to the clamping blocks 5 and 6 by extensible rods.

Each of the clamping blocks 5 and 6 includes a web portion 9 having enlarged portions 10 at opposite ends thereof which are drilled to provide parallel bores 11 for slidably receiving pairs of extensible rods 12—13. The pair of rods 12 being slidably mounted in the clamping block 5 and the pair of extensible rods 13 being likewise slidably mounted in the clamping block 6. The clamping blocks 5 and 6 are slidably connected together to move in parallel relation by means of a pair of guide pins 14 which have one end threaded as at 15 for being received in correspondingly threaded openings 16 in the web 9 of the clamping block 6. The opposite ends of the guide pins 14 are slidably received in alined openings 17 in the clamping block 5 (Figure 6).

The web portions 9 of the clamping blocks 5 and 6 are further provided with alined openings 18 and 19, and as illustrated in Figure 7 a screw threaded shaft 20 has one end received in the correspondingly threaded opening 18 of the clamping block 5, while the other end projects through the opening 19 which is of slightly increased diameter to permit free sliding movement thereof. A wing nut 21 is threaded on the screw threaded rod 20 to move the clamping plates 5 and 6 toward one another when said wing nut is turned home against the yielding action of a coil spring 22 which is mounted between the clamping plates 5 and 6 in encircling relation with the screw threaded shaft 20. The ends of the coil spring 22 abut the inner wall surfaces of the clamping plates 5 and 6.

Formed integral with the web portions 9 of the clamping plates 5 and 6 is a laterally extending lug 23, one of which is provided with a threaded opening for receiving a correspondingly threaded screw 24 having a thumb engaging head 25. The free end of the thumb screw 24 engages the other lateral projection 23 carried by the clamping plate 6.

Thumb screws 27 may be mounted in suitable threaded openings 28 in the enlarged portions 10 of the clamping plates 5 and 6 to permit the sets of rods 12—13 to be adjusted to various positions and quickly locked in place.

The jig plates 7 and 8 include elongated body portions 28 which are formed from castings having the inner surfaces 29 machined to provide relatively smooth work engaging contact faces. Formed integral with each of the body portions and adjacent the ends thereof are spaced sets of enlarged bosses 30 having bores 31 which are alined with the sets of rods 12—13. The pair of rods 12 are securely anchored in the bores 31 of the jig plate 7 by means of grub screws 32 which are provided with hexagonal recesses for receiving the end of a correspondingly shaped tool so that great force may be applied in tightening the grub screws 32. Similarly, the pair of extensible rods 13 each have one of their ends anchored in the spaced enlarged bosses 30 of the jig plate 8 by means of similar grub screws 32, and said screws are provided with hexagonal openings for likewise receiving a correspondingly shaped wrench.

Each of the jig plates 7 and 8 are provided with sets of drill receiving openings 33 to 36 inclusive and 37 to 40 inclusive, and said openings are arranged so that pairs 33—37, 34—38, 35—39 and 36—40 are axially alined to permit a drill to be inserted in the desired opening in one of the jig plates to position and guide the drill, while the opposite opening receives the drill as it emerges from the work and prevents the same from being splintered. Obviously, any two or more alined sets of openings can be used, and said openings are of a diameter to permit a running fit of the drill or other tool.

Formed integral with the clamping plate 6 is a block 42 having a transverse bore 43 for slidably receiving a gauge rod 44, one end of which is angularly bent as at 45 to engage the end edge of a door panel or other work piece to provide a reference point for correctly positioning the jig fixture in one direction. A thumb screw 46 is received in a correspondingly threaded opening in the block 42 to contactually engage the gauge rod 44 and securely hold the same in its predetermined position.

In operation the thumb nut 21 and thumb screw 24 are loosened to permit the coil spring 22 to separate the clamping blocks 5 and 6, and likewise the jig plates 7 and 8 so that the jig plates may be received on opposite sides of a work piece W such as a door or the like, with the guide pins 14 engaging the longitudinal edge W' of the work piece as clearly shown in Figures 1 to 3 inclusive. After the clamping blocks 5 and 6 have been positioned as above, the jig plates 7 and 8 are moved to the desired location to position the center of the openings 33—36 and 37—40 in the respective jig plates 7 and 8 so that said openings will register with the position of openings or bores to be formed in the work W. After the jig plates 7 and 8 have been correctly positioned for a particular set up, the thumb screws 27 are tightened to securely lock the extension rods 12 and 13 in position so that the sets of openings 33—37, 34—38, 35—39 and 36—40 are in axial alinement. The above setting positions the jig plates 7 and 8 with respect to the longitudinal edge W' of the work piece, and to complete the set up, the gauge rod 44 is adjusted from the end edge W'' by engaging the angular end 45 of said rod with said edge and then sliding the jig plates and clamping blocks to position the jig plates in the desired location and for the accurate presentation of the drill to the work piece through the selected bushing opening 33—36. Thus, the longitudinal edge W' is engaged by the guide pins 14 and provides a reference point for positioning the jig plates in one direction, while the end edge W'' forms a reference point engageable by the angular end 45 of the gauge rod 44 to correctly position the jig plates in another direction at an angle of 90° with respect to the first mentioned direction.

After the portable drilling jig and fixture has been set up for a particular production job, it may be quickly and easily applied to the work piece and clamped in position by manipulating the thumb nut 21 and thumb screw 25. The thumb nut 21 draws the clamping plates 5 and 6 together against the yielding action of the coil spring 22, and the thumb screw 25 forces the jig plates 7 and 8 into tight clamping engagement with the opposite surfaces of the work piece W. Thus, the openings formed in successive work pieces will be correctly and accurately positioned with respect to one another and the openings in each work piece will be located in exactly the same position as successive work pieces. Hence, the drilling jig is particularly useful for repetitive work, and once the fixture is set up for a particular production job it can be conveniently used for drilling holes in successive work pieces for receiving screws and the like used in the attachment of various pieces of hardware such as hinges, door and drawer handles, locks, latches and other devices.

The drilling jig is particularly useful for drilling screw receiving openings in doors to facilitate the attachment of hinges, and by simply reversing the drilling jig screw receiving openings may be formed predetermined distances from the upper and lower edges of the door. This is due to the fact that the drilling jig includes opposed jig plates having registering sets of openings which may be used in one position for drilling the holes adjacent the end edge of a door or the like, and then by reversing or turning the jig over the same openings will be positioned equal dimensions from the other end edge of the door. When the jig is turned over or reversed the gauge rod 44 extends in the opposite direction so that the angular end 45 will engage the other end edge of the door. The drill may be presented to the work through the openings in either of the jig plates 7 and 8, since said openings are of a diameter to permit a running fit of the drill and if desired, may be provided with suitable bushings which are common in drilling jig fixtures.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

I claim:

1. In a portable drilling fixture adapted to be movably attached to the marginal edges of substantially flat work pieces, a pair of clamping plates arranged to move in parallelism, a pair of jig plates adjustably and slidably connected with said clamping plates and projecting laterally therefrom, means for urging said clamping plates together to force the jig plates into clamping engagement with the work and means for gauging the movement of said jig plates to position the same from two adjacent angular edge portions of said work piece.

2. In a portable drilling jig and fixture adapted to be removably attached to the marginal edges of substantially flat work pieces, a pair of clamping plates, a pair of jig plates adjustably and slidably connected one to each of said clamping plates to extend laterally therefrom, said jig plates being provided with axially alined sets of openings to receive a drill and means for moving said clamping plates to control the movement of the jig plates.

3. In a portable drilling jig and fixture adapted to be removably attached to the marginal edges of substantially flat work pieces, a pair of clamping plates, a pair of jig plates adjustably and slidably connected one to each of said clamping plates to extend laterally therefrom, said jig plates being provided with axially alined sets of openings to receive a drill and means for moving said clamping plates to control the movement of the jig plates, said clamping plates being provided with guide pins to hold the clamping plates in parallel relation and form stop means engageable with the edge of the work piece.

4. In a portable drilling jig and fixture, a pair of clamping plates slidably connected to move in parallel relation toward and away from one another, a pair of extension rods carried by each plate and projecting laterally in parallel relation one to the other, a pair of jig plates adjustably and slidably connected to the outer ends of said extension rods and means on said clamping plates operable to move the jig plates into clamping engagement with the edge of a work piece.

5. In a portable drilling jig and fixture, a pair of clamping plates slidably connected to move in parallel relation toward and away from one another, a pair of extension rods carried by each plate and projecting laterally in parallel relation one to the other, a pair of jig plates adjustably and slidably connected to the outer ends of said extension rods and means on said clamping plates operable to move the jig plates into clamping engagement with the edge of a work piece, said jig plates being provided with axially alined sets of differently spaced openings for receiving a drill.

6. In a portable drilling jig and fixture, a pair of clamping plates each having a pair of bores arranged in parallel spaced relation, extension rods slidably mounted in said bores and extending on opposite sides of the work piece, jig plates mounted one on each end of each pair of extension rods for clampingly engaging the opposed surfaces of a work piece, guide pins connecting the clamping plates to form stop means for limiting movement of the jig plates in one direction and also providing means for causing the clamping plates to move in parallel relation toward and away from one another, and clamping screws carried by the clamping plates for moving the same toward and away from one another.

7. In a portable drilling jig and fixture, a pair of clamping plates, guide means connecting the plates to guide the same in parallel relation toward and away from one another, said guide means being arranged to engage one edge of a work piece to correctly position the clamping plates, jig plates, extension rods connecting the jig plates to the clamping plates and means on the clamping plates operable to move the jig plates into tight contactual engagement with opposed faces of the work piece.

8. In a portable drilling jig and fixture, a pair of clamping plates, guide means connecting the plates to guide the same in parallel relation toward and away from one another, said guide means being arranged to engage one edge of a work piece to correctly position the clamping plates, jig plates, extension rods connecting the jig plates to the clamping plates and means on the clamping plates operable to move the jig plates into tight contactual engagement with opposed faces of the work piece, said jig plates being provided with sets of axially alined openings spaced apart different distances.

9. In a portable drilling jig and fixture adapted to be movably attached to the marginal edge of work piece panels, a pair of clamping plates, a pair of jig plates, extension rods connecting the jig plates one with each clamping plate, guide pins carried by one of the clamping plates slidably received in openings in the other of said plates to guide the clamping and jig plates in parallel relation toward and away from one another and provide stop means engageable with the edge of the panel for positioning the jig plates, a gauge rod adjustably secured to one of the clamping plates having an angular end portion adapted to engage an adjacent edge of the work piece panel to position the jig plates in another direction, and clamping screws carried by the clamping plates which are adapted to be manually operated to cause the jig plates to tightly engage opposed marginal surfaces of the work piece panel.

10. In a portable drilling jig and fixture adapted to be removably attached to the marginal edges of work piece panels, a pair of clamping plates each being provided adjacent its ends with parallel extending bores, extension rods received in said bores, a pair of jig plates affixed to the outer ends of each pair of extension rods corresponding to the clamping plates, guide pins slidably connecting the clamping plates and arranged to engage the edge of the work panel to position the jig plates, a gauge rod adjustably attached to one of the clamping plates having an angular end portion engageable with an adjacent edge of the panel work piece to position the jig plates in a direction at right angles with respect to the first mentioned direction, clamping screws connecting the clamping plates operable to urge the jig plates into engagement with opposite faces of the work piece and yielding spring means between the clamping plates to urge the same apart.

11. In a portable drilling jig and fixture adapted to be removably attached to the marginal edges of a work piece panel, a pair of clamping plates, a pair of extension rods connected to each clamping plate and extending in parallel relation, a jig plate affixed to the outer ends of corresponding extension rods of each clamping plate, said jig plates being provided with alined sets of spaced openings guide pins slidably connecting the plates to move toward and away from one another in parallel relation, said guide pins being arranged to engage the edge of the work piece to position the jig plates in one direction, clamping screws for moving the clamping plates together and a gauge rod carried by the clamping plates having an angular end portion engageable with an adjacent edge of the work panel to position the jig plates in a direction angularly displaced 90° from the first mentioned direction.

12. In a portable drilling jig and fixture adapted to be removably attached to the marginal edges of a work piece panel, a pair of clamping plates, a pair of extension rods adjustably connected to each clamping plate and arranged to extend in parallel relation one with the other, a jig plate affixed to the outer ends of certain pairs of extension rods corresponding to the rods carried by each clamping plate, said jig plates being provided with alined sets of differently spaced openings to receive a drill, a pair of guide pins carried by one of the clamping plates having their ends slidably mounted in openings in the other plate, said guide pins being arranged to engage the edge of the work panel and position the jig plates in one direction, a gauge rod adjustably affixed to one of the clamping plates and extending at an angle of 90° from the extension rod, said extension rod being provided with an angular end portion to engage an adjacent edge of the work panel, a screw shaft connected to one of the clamping plates and extending through an opening in the other plate for receiving a clamping thumb nut, yielding spring means encircling the screw shaft to yieldingly urge the clamping plates apart, extensions formed on each of the clamping plates and a thumb screw extending through a correspondingly threaded opening in one of said extensions having its end in engagement with the other extension to force the jig plates into tight contactual engagement with opposed surfaces of the work piece panel.

ELWOOD A. HENGST.

No references cited.